UNITED STATES PATENT OFFICE.

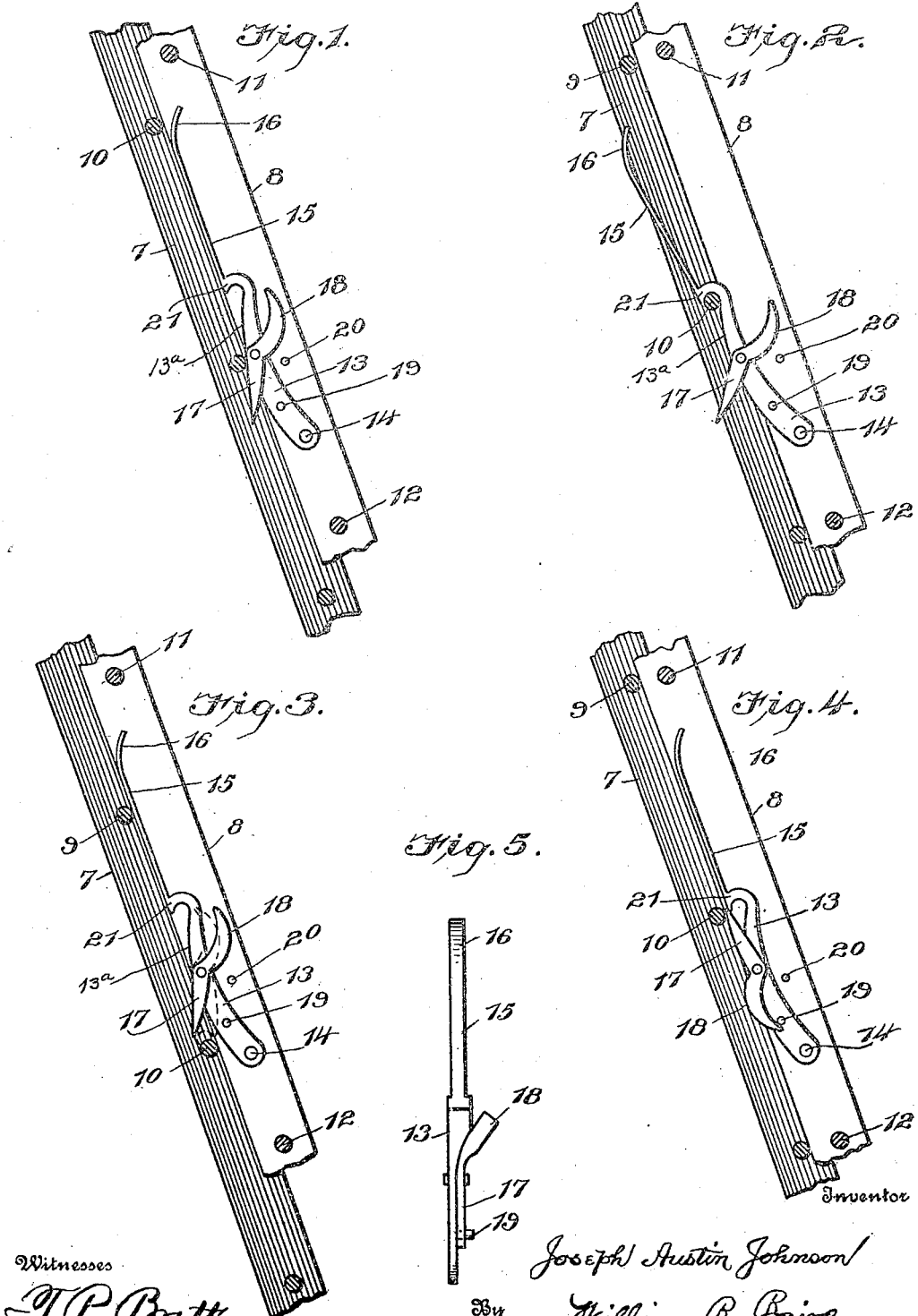

JOSEPH AUSTIN JOHNSON, OF HAMPTON, NEW HAMPSHIRE.

EXTENSION-LADDER.

952,432.

Specification of Letters Patent. Patented Mar. 15, 1910.

Application filed July 27, 1906. Serial No. 328,100.

*To all whom it may concern:*

Be it known that I, JOSEPH AUSTIN JOHNSON, a citizen of the United States, residing at Hampton, in the county of Rockingham and State of New Hampshire, have invented certain new and useful Improvements in Extension-Ladders, of which the following is a specification.

My invention relates to that class of extension ladders which consists of two or more sections, (generally of two sections), one of which fits loosely between the sides of the other and is readily slidable therein so as to be quickly raised or lowered to extend the ladder.

The object of the invention is to provide such ladders with improved means whereby the movable section may be easily and quickly raised and lowered, quickly and readily stopped and held at any desired point in the extension thereof, or permitted to be lowered into its bottom position for purposes of storage or transportation.

In order that others skilled in the art to which my invention most nearly appertains may be enabled to make and use the same, I will now proceed to describe the construction and operation thereof, in connection with the accompanying drawing, in which—

Figure 1 is a partial sectional view on a plane cutting vertically through the ladder rounds, the hook and dog being in the positions assumed when the movable section is being raised. Fig. 2 is a similar view with the hook and dog in the positions they assume when supporting the extensible or slidable section in its extended or partially extended position. Fig. 3 is a similar view with the hook and dog in the positions they assume when the beak of the hook rests upon a round of the stationary section, the dog being shown in dotted lines in the position it holds when passing a round of the stationary section. Fig. 4 is a similar view with the hook and dog in position to permit the extensible section to be moved downward in the stationary section without engaging the hook with the rounds of the ladder. Fig. 5 is a face view in elevation of a hook and dog removed from the ladder.

Like reference characters mark the same parts in all of the figures of the drawing.

Referring specifically to the drawing, 7, is the stationary section and, 8 the slidable section of any ordinary extension ladder, the latter, being of proper dimensions to permit of its sliding up and down between the standards of the former, the sections 7, 8, having rounds of any preferred or ordinary construction marked respectively 9, 10, 11, and 12. There are two hooks 13, pivotally secured at their lower ends opposite to each other to the inner face of the two standards of the slidable section by screws or bolts 14, the points of such hooks being extended beyond their engaging ends to form beaks 15, 15, which beaks are of the same lengths as the hooks themselves and have slightly curved or inclined ends 16. These hooks are so arranged that their centers of gravity, when the ladder is vertical, and more so when the ladder is inclined as in the position to rest its upper end against a building, are inside of the vertical planes passing through their pivots, whereby the natural tendency of the beaks of the hooks is to press or rest upon the rounds of the section 7 (and for the hooks to pass over said rounds) when the section 8 is moved on the section 7. This action takes place automatically as the slidable section is raised so that by slightly dropping this section when the hooks are above any round of section 7, the hooks will engage upon the round, as the round 10 in Fig. 2, and thus securely hold the section 8 raised or extended. During the raising of the slidable section it is necessary that some provision be made to prevent the ends 16 of beaks 15 from passing under the rounds of the stationary section. This is accomplished by curving the shank of the hook so that during the extension of the ladder its edge 13$^a$ will bear with cam-like action against the round of the stationary section next below the one about to be reached by the end 16 of the beak 15, whereby, as the ladder is extended, the parts are brought from the position shown in Fig. 2 to substantially that shown in Fig. 1. If the shank of the hook were straight it is obvious that the end 16 of the beak 15 would pass below or behind the round of the stationary section and prevent the further upward movement of the slidable section. In this position of Fig. 1 it will be observed that the straight main body, 15, of the beak is in the same plane as the center of the curved cam-like surface 13$^a$ of the hook and which plane is coincident with or parallel to the inner surface of the standards of the slidable section which rests upon the rounds of the movable section. This plane in which the beak lies is outside of the vertical plane of the pivot 14 thus, as stated before, bringing the center of gravity of the hook and beak, outside of the vertical plane of said pivot 14, even when the ladder is vertical, which is of importance on account of the fact that it is very often convenient and very often necessary, especially with heavy ladders, to extend the slidable section when the ladder is in a vertical position.

In order that the hooks 13 may not engage the rounds of section 7 when it is desired to lower said section 8, I provide balanced dogs or pawls 17, 17, which are pivotally secured on the inner sides of the hooks at near the mid-length of said hooks, said pawls or dogs having extensions 18, 18, beyond their pivots, of the same weight as the dogs themselves so as to form, with the dogs, a balanced guard which will normally stand in a balanced, substantially horizontal position.

When section 8 is held up by the hooks, as in Fig. 2, and it is desired to lower it to its bottom position which would bring the hooks below round 10, said section 8 is raised until the pawl reaches the position of Fig. 3 when, as soon as the dog slips past, or above the round 10, (see dotted line in said figure), its extension 18 will drop to a substantially horizontally balanced position as shown in dotted lines in Fig. 4 so that the dog proper is in the track of the rounds of the stationary section 7. Now the section 8 may be lowered to any desired extent, the dog being pressed upward, as it rides over the rounds of section 7, to the position shown in Fig. 4 and causing the hooks to pass over the round below without engaging therewith. In the position of Fig. 4, and while being pressed to that position by the rounds over which it is passing in the downward movement of the slidable section, the movement of the dog on its pivot is limited by a pin 19 projecting from the hook 13 against which the dog 17 impinges, the extension being bent aside, as clearly shown in Fig. 5, so that it will clear the pin 19 and the thickened portion of the hook.

The hooks 13 are prevented from falling back on their pawls out of operative position, by means of pins 20 projecting from the inner faces of the standards of the slidable section upon which said hooks will rest when the ladder is moved from place to place, if tilted in the opposite direction from that assumed when the ladder is set up against a building.

It will be observed that in order to operate as before described to lower the movable section, the distance from the point 21 of the hook to the point of the dog when in the reverse position of Fig. 3, must be less than the distance between the rounds of the section 7, so that the dog may tilt on its pivot into the balanced or horizontal position and then to the position of Fig. 4 to guard the point of the hook.

The length of the beak and hook combined being greater than the distance between adjacent rounds of the stationary section, it will be impossible for the hook at any time to fall forward between the rounds and as a consequence, the point of the beak will always be in position to pass over said rounds when the movable section is being raised, thereby avoiding the liability of accidentally obstructing the outward or lengthening adjustment.

What I claim as new is:

The combination with the movable section of an extension ladder, of hooks pivotally mounted at their lower ends on the inner faces of the standards of the sections, and provided with flat beaks, the terminals of which are curved to provide fenders, the intermediate portion of the hooks being arranged to engage with an adjacent round to swing the hooks to permit the fenders to clear the next adjacent round, balanced dogs pivotally connected with the shanks of the hooks intermediate of their ends and provided with offset extensions and arranged automatically to swing in the path of the hooks to prevent the latter from catching on the rounds of the stationary section when the movable section is lowered, and stops to limit the swinging movement of the dogs in two directions.

In testimony whereof I affix my signature in presence of two witnesses.

JOSEPH AUSTIN JOHNSON.

Witnesses:
BENJIMIN J. BOOTHROYD,
IRA S. JONES.